US009377527B2

(12) United States Patent
Marr et al.

(10) Patent No.: US 9,377,527 B2
(45) Date of Patent: Jun. 28, 2016

(54) METHOD AND APPARATUS FOR ENHANCED MULTI-NODE UTILIZATION OF AN ELECTROMAGNETIC STATE SPACE

(71) Applicant: Raytheon Company, Waltham, MA (US)

(72) Inventors: Harry Marr, Manhattan Beach, CA (US); Charles T. Hansen, Palos Verdes Estates, CA (US); Brian Pierce, Moreno Valley, CA (US)

(73) Assignee: Raytheon Company, Waltham, MA (US)

( * ) Notice: Subject to any disclaimer, the term of this patent is extended or adjusted under 35 U.S.C. 154(b) by 287 days.

(21) Appl. No.: 14/078,997

(22) Filed: Nov. 13, 2013

(65) Prior Publication Data

US 2015/0130656 A1    May 14, 2015

(51) Int. Cl.
*G01S 13/06* (2006.01)
*G01S 13/00* (2006.01)
*G01S 7/02* (2006.01)
*G01S 13/24* (2006.01)
*H04W 16/00* (2009.01)

(52) U.S. Cl.
CPC .............. *G01S 13/006* (2013.01); *G01S 7/023* (2013.01); *G01S 13/24* (2013.01); *H04W 16/00* (2013.01)

(58) Field of Classification Search
CPC ....... G01S 13/006; G01S 7/023; G01S 13/24; H04W 16/00
USPC .................................................. 342/165, 195
See application file for complete search history.

(56) References Cited

U.S. PATENT DOCUMENTS

| 6,239,740 B1* | 5/2001 | Collins | G01S 15/66 |
| | | | 342/109 |
| 9,223,045 B2* | 12/2015 | Naqvi | G01V 3/12 |
| 2015/0130656 A1* | 5/2015 | Marr | G01S 13/006 |
| | | | 342/165 |
| 2015/0319634 A1* | 11/2015 | Zwirn | G01S 11/02 |
| | | | 370/252 |

FOREIGN PATENT DOCUMENTS

WO    WO 2012149276 A1 *  11/2012  ................ G01S 3/74

OTHER PUBLICATIONS

Dean, et al.; Approximatng the Stochastic Knapsack Problem: The Benefit of Adaptivity; Foundations of Computer Science, 2004; 45th Annual IEEE Symposium on; Oct. 17-19, 2004; pp. 208-117.
Melvin, "A STAP Overview;" IEEE A&E Systems Magazine; vol. 19; No. 1; Jan. 2004; pp. 19-35.
Melvin; "Application of STAP in Advance Sensor Systems;" RTO SET Lecture Series on "Military Application of Space-Time Adaptive Processing;" Jan. 2003; pp. 7-1 through 7-20.
Melvin; "Space-Time Detection Theory;" Georgia Tech Research Institute; Jan. 2003; pp. 1-1 through 1-19.
Ward; "Space-Time Adaptive Processing for Airborne Radar;" Massachusetts Institute of Technology Lincoln Laboratory; Technical Report 1015; Dec. 13, 1994; 177 pages.

(Continued)

*Primary Examiner* — John B Sotomayor
(74) *Attorney, Agent, or Firm* — Daly, Crowley, Mofford & Durkee, LLP (57) ABSTRACT

Methods and systems are provided for efficiently packing nodes within an electromagnetic state space.

20 Claims, 8 Drawing Sheets

(56) References Cited

OTHER PUBLICATIONS

2012 World Radiocommunication Conference (WRC-12)—Agenda and References (Resolutions and Recommendations); International Telecommunication Union; documents at http://www.itu.int/ITU-R/index.asp?category=conferences&rlink=r-12.

Bansal, et al.; "Improved approximation algorithms for multidimensional bin packing problems;" Proceedings of the 47th Annual Symposium on Foundations of Computer Science (FOCS'06); Oct. 2006; pp. 697-708.

Bergin, et al.; "Radar Waveform Optimization for Colored Noise Mitigation;" 2005 IEEE Radar Conference; May 2005; pp. 149-154.

Bidigare, et al.; "Implementation and Demonstration of Receiver-Coordinated Distributed Transmit Beamforming Across an Ad-hoc Radio Network;" Signals, Systems and Computers (ASILOMAR); 2012 Conference Record of the Forty Six Asilomar Conference; Nov. 4-7, 2012; pp. 222-226.

Bidigare, et al.; "Initial Over-the-Air Performance Assessment of Ranging and Clock Synchronization Using Radio Frequency Signal Exchange;" 2012 IEEE Statistical Signal Processing Workshop (SSP); Aug. 5-8, 2012; pp. 273-276.

Boyne; "QinetiQ Bandsharing Concepts;" QinetiQ Ltd. Farnborough, Hampshire, UK, Oct. 2005; pp. 1-35.

Brown, et al.; "Receiver-Coordinated Zero-Forcing Distributed Transmit Nullforming;" Statistical Signal Processing Workshop (SSP), 2012 IEEE; Aug. 5-8, 2012; pp. 269-272.

Carroll, et al.; "Case Study: Investigation of Interference into 5 GHz Weather Radars from Unlicensed National Information Infrastructure Devices, Part I;" NTIA Technical Report TR-11-473; Nov. 2010.

Carroll, et al.; "Case Study: Investigation of Interference into 5 GHz Weather Radars from Unlicensed National Information Infrastructure Devices, Part II;" NTIA Technical Report TR-11-479; Jul. 2011.

Carroll, et al.; "Case Study: Investigation of Interference into 5 GHz Weather Radars from Unlicensed National Information Infrastructure Devices, Part III;" NTIA Technical Report TR-11-486; Jun. 2012.

Cave; "Independent Audit of Spectrum Holdings;" HM Treasury, 1 Horse Guards Road, London, UK; www.spectrumaudit.org.uk; Dec. 2005.

Cotton, et al.; ISART 2011 Proceedings—Developing Forward Thinking Rules and Processes to Fully Exploit Spectrum Resources: An Evaluation of Radar Spectrum Use and Management; NTIA Special Publication SP-12-485; Mar. 2012.

Dean, et al.; "Approximating the Stochastic Knapsack Problem: The Benefit of Adaptivity;" Proceedings of the 45th Annual IEEE Symposium on Foundations of Computer Science (FOSC'04); Oct. 17-19, 2004; pp. 208-217.

Federal Communications Commission; Report and Order #FCC 03-287; Nov. 12, 2003; apps.fcc.gov/ecfs/documents/view?id=6515292583.

Ganley; "Bandsharing Testing Programme for the Band 2700 to 3400 MHz;" ERA Technology Ltd; Leatherhead, Surry, UK, Aug. 2008.

Hulbert; "Review of Bandsharing Solutions—Final Report;" Roke Manor Research; Report No. 72/05/R/281/R; Issue 1 ; Sep. 2005.

IEEE Std. 802-22; Part 22: Cognitive Wireless RAN Medium Access Control (MAC) and Physical Layer (PHY) Specifications: Policies and Procedures for Operation in the Bands; IEEE Computer Society; Jul. 1, 2011.

Jaffer, et al.; "Estimation of Range-Dependent Clutter Covariance by Configuration System Parameter Estimation;" Radar Conference; 2005 IEEE International; May 9-12, 2005; pp. 596-601.

Johnson; "Approximation Algorithms for Combinatorial Problems;" Journal of Computer and System Sciences; vol. 9; Issue 3; Dec. 1974; pp. 256-278.

Locke; "As Assessment of the Near-Term Viability of Accommodating Wireless Broadband Systems in the 1675-1710 MHz, 1755-1780 MHz, 3500-3600 MHz, and 4200-4220 MHz, 4380-4400 MHz Bands;" (President's Spectrum Plan Report); Oct. 2010; http://www.ntla.doc.gov/files/ntia/publications/fasttrackevaluation_11152010.pdf.

Marcus; "Thoughts on Radar/Communications Spectrum Sharing;" Submittal to the International Symposium on Advanced Radio Technologies 2011; www.marcus-spectrum.com.

McHenry, et al.; "Determination of Detection Thresholds to Allow Safe Operation of Television Band "White Space" Devices;" DySPAN 2008; 3rd IEEE Symposium on New Frontiers in Dynamic Spectrum Access Networks; Oct. 14-17, 2008; pp. 1-12.

McHenry, et al.; DSA Operational Parameters with Wireless Microphones; 2010 IEEE Symposium on New Frontiers in Dynamic Spectrum; Apr. 6-9, 2010; pp. 11.

McHenry, et al.; "The Probe Spectrum Access Method;" DySPAN 2005; First IEEE Symposium on New Frontiers in Dynamic Spectrum Access Networks; Nov. 8-11, 2005; pp. 346-351.

McHenry, et al.; "XG DSA Radio System;" DySPAN 2008; 3rd IEEE Symposium on New Frontiers in Dynamic Spectrum Access Networks; Oct. 14-17, 2008; pp. 1-11.

Melvin; "Application of STAP in Advanced Sensor Systems;" RTO SET Lecture Series on Military Application of Space-Time Adaptive Processing; Sep. 2002; pp. 7/1-7/20.

Melvin; "A STAP Overview;" IEEE A&E Systems Magazine; vol. 19; No. 1; Jan. 2004; Part 2; pp. 19-35.

Melvin; "Space-Time Detection Theory;" RTO SET Lecture Series on Military Application of Space-Time Adaptive Processing; Sep. 2002; 20 pages.

OfCom (Office of Communications); "Coexistence of S Band radar systems and adjacent future services;" Riverside House, 2a Southwark Bridge Road, London; Dec. 11, 2009; 57 pages.

Ramanathan, et al.; "Topology Control of Multihop Wireless Networks using Transmit Power Adjustment;" IEEE INFOCOM 2000; 19th Annual Joint Conference on the IEEE Computer and Communications Societies; Mar. 26-30, 2000; pp. 101-413.

Sanders, et al.; "Analysis and Resolution of RF Interference to Radars Operating in the Band 2700-2900 MHz from Broadband Communication Transmitters;" NTIA Report 13-490; U.S. Department of Commerce National Telecommunications and Information Administration; Oct. 2012.

Sanders, et al.; "Effects of RF Interference on Radar Receivers;" NTIA Report TR-06-444; Feb. 2006.

Sit, et al.; "The OFDM Joint Radar-Communication System: An Overview;"SPACOMM 2011: The Third International Conference on Advances in Satellite and Space Communications; Jan. 2011; pp. 69-74.

Sturm, et al.; "An OFDM System Concept for Joint Radar and Communications Operations;" IEEE 69th Vehicular Technology Conference, VTC Spring 2009; Apr. 26-29, 2009; pp. 1-5.

Ward; "Space-Time Adaptive Processing for Airborne Radar;" Technical Report 1015; Massachusetts Laboratory; Dec. 13, 1994.

War, et al.; "Space-Time Adaptive Processing for ATMI and GTMI Radar;" 2000 IEEE Radar Conference; Apr. 24-27, 2006.

Notification of Transmittal of the International Search Report and the Written Opinion of the International Searching Authority, or the Declaration, PCT/US2014/046642, date of mailing Oct. 30, 2014, 5 pages.

Written Opinion of the International Searching Authority, PCT/US2014/046642, date of mailing Oct. 30, 2014, 12 pages.

Piezzo Marco et al.: "Cognitive radar waveform design for spectral coexistence", 2013 IEEE Radar Conference (RADARCON13), IEEE, Apr. 29, 2013, pp. 1-4. XP032479535, ISSN: 1097-5659, DOI: 10.1109/RADAR.2013.6586024 ISBN: 978-1-4673-5792-0 [retrieved on Aug. 23, 2013].

La Manna M. et al.; "Design of a cognitive radar for operation in spectrally dense environments", 2013 IEEE Radar Conference (RADARCON13), IEEE, Apr. 29, 2013, pp. 1-6. XP032479605, ISSN: 1097-5659, DOI:10.1109/RADAR.2013.6585996. ISBN: 978-1-4673-5792-0. [retrieved on Aug. 23, 2013].

Phani Chavali et al.,: "Scheduling and Power Allocation in a Cognitive Radar Network for Multiple-Target Tracking", IEEE Transactions on Signal Processing, IEEE Service Center, New York, NY, US. vol. 60, No. 2, Feb. 1, 2012, pp. 715-729, XP011397193, ISSN: 1053-587X, DOI:10.1109/TSP.2011.2174989.

Joseph R. Guerci: "Home Cognitive Radar: The Next Radar Wave?", Microwave Journal, Jan. 10, 2011, XP055146490, retrieved from the (56) References Cited

OTHER PUBLICATIONS internet: URL:http://www.microwavejournal.com/articles/10487-cognitive-radar-the-next-radar-wave?v=preview [retrieved on Oct. 14, 2014].
Guerci J.R.: "Cognitive radar: A knowledge-aided fully adaptive approach", Radar Conference, 2010 IEEE, IEEE, Piscataway, NJ, USA, May 10, 2010, pp. 1365-1370, XP031696520, ISBN; 978-1-4244-5811-0.
Alfonso Farina: "Chapter 9: Electronic Counter-Countermeasures" in: "Radar Handbook ($2^{nd}$ Edition)", Jan. 1, 1990, McGraw Hill, New York, NY, US, XP055146969, ISBN: 978-0-07-057913-2, pp. 9.1-9.33, sec. 9.10.
Simon Haykin: "Cognitive Dynamic Systems: Radar, Control, and Radio [Point of View]", Proceedings of the IEEE, IEEE. New York, US, vol. 100, No. 7, Jul. 1, 2012, pp. 2095-2103, XP011447713, ISSN: 0018-9219, DOI:10.1109/JPROC.2012.2193709.

\* cited by examiner

METHOD AND APPARATUS FOR ENHANCED MULTI-NODE UTILIZATION OF AN ELECTROMAGNETIC STATE SPACE

BACKGROUND

Traditionally, military radar systems and other military radio frequency (RF) systems have been assigned specific portions of the electromagnetic spectrum to operate within. Recently, the Federal Communications Commission (FCC) has announced that certain portions of the electromagnetic spectrum that were previously allotted exclusively to military systems would now be auctioned off to the public. This could lead to a situation where military radar systems will have to share electromagnetic resources with one or more other commercial or military RF systems. Advanced RF systems may also wish to allocate existing spectrum in a dynamic way. Techniques are therefore needed that will allow military radar systems to coexist with other RF systems in an efficient and timely manner.

SUMMARY

Concepts, systems, circuits, and techniques described herein are capable of allowing military radar systems to share electromagnetic resources with other RF systems, both military and commercial, in an efficient and timely manner. In some embodiments, the concepts, systems, circuits, and techniques allow a large number of RF users/systems to occupy an electromagnetic state space in a nearly optimal manner, with little to no overlap between the systems. A multi-dimensional electromagnetic state space may be defined in which a plurality of radio frequency (RF) nodes are to operate. The electromagnetic state space may have any number of coordinates from any number of different dimensions selected from, for example, the three spatial dimensions (x, y, z), amplitude, time, frequency, polarization, orthogonal code, and/or others. The electromagnetic state space may be filled with volume elements corresponding to the operational states of the radar and other nodes (e.g., communication nodes, etc.) in the distributed system. The "electromagnetic state" may be defined as a set of d-dimensional coordinates, where a coordinate consists of a scalar value for each dimension. For example, a radar beam may take up a large volume of physical space and this can be expressed using a plurality of 3 valued-pairs (x,y,z). So each "node" in a system could very likely have a large number of up to 7 dimensional "coordinates" associated with it. In a 7-dimensional example, mathematically each node may be expressed as an N×7 matrix, where N is the number of sets of coordinates associated with that particular node.

Each volume element may correspond to a particular radar or communication task or mission to be performed at a certain time. For example, one volume element may correspond to a search mode associated with a radar node to interrogate a particular region of space at a particular time. Another volume element may correspond to the transfer of a packet between first and second communication nodes at a particular time and frequency. Techniques are provided herein for packing the volume elements within the electromagnetic volume (or state space) of interest in an efficient and timely manner. In some embodiments, techniques are provided that are capable of achieving results that are similar to those achievable by solving the NP-hard stochastic knapsack problem (i.e., a near-optimal result), but can be performed in real time with a realizable computational complexity (i.e., in polynomial time). Thus, near optimal packing results may be obtained in some embodiments in polynomial time. Although described in many places herein as a technique to allow a radar system to share an electromagnetic state space with other systems, it should be appreciated that techniques and features described herein may also be used to allow any type of nodes to efficiently utilize a given electromagnetic state space. Thus, the techniques and systems are not limited to use with radar systems.

In accordance with one aspect of the concepts, systems, circuits, and techniques described herein, a machine-implemented method for operating a radar system within a multi-dimensional electromagnetic state space, comprises: (a) identifying a plurality of nodes to operate within the electromagnetic state space, the plurality of nodes including a radar node and at least one other node; (b) estimating an electromagnetic volume of each node within the plurality of nodes; (c) attempting to fit the estimated electromagnetic volumes of the plurality of nodes within the electromagnetic state space without overlap, wherein attempting to fit includes modifying transmit parameters associated with one or more nodes; and (d) if the electromagnetic volumes of the plurality of nodes do not fit within the electromagnetic state space without overlap: (i) determining a reduced electromagnetic volume for the radar node that will allow the radar node to achieve at least a minimum effectiveness level; and (ii) repeating attempting to fit the estimated electromagnetic volumes of the plurality of nodes within the electromagnetic state space without overlap.

In one embodiment, the method further comprises: before repeating attempting to fit the estimated electromagnetic volumes within the electromagnetic state space, determining a reduced electromagnetic volume for each directly controllable node within the plurality of nodes, other than the radar node, that will allow the controllable node to achieve at least a minimum effectiveness level.

In one embodiment, the method further comprises: if the electromagnetic volumes of the plurality of nodes do not fit within the electromagnetic state space without overlap after multiple iterations of determining reduced electromagnetic node volumes for the radar node and the directly controllable nodes, removing one or more of the plurality of nodes from the electromagnetic state space.

In one embodiment, the electromagnetic state space is defined based upon the operational needs of the radar node.

In one embodiment, identifying a plurality of nodes includes identifying nodes currently transmitting within the electromagnetic state space.

In one embodiment, identifying a plurality of nodes includes analyzing signals received from the electromagnetic state space.

In one embodiment, identifying a plurality of nodes includes checking one or more databases where users register for use of electromagnetic resources.

In one embodiment, determining a reduced electromagnetic volume for the radar system includes using space-time adaptive processing (STAP) techniques.

In one embodiment, the electromagnetic state space includes coordinates from at least 4 dimensions selected from the following: the three spatial dimensions (x, y, z), time, frequency, polarization direction, and orthogonal code.

In one embodiment, the electromagnetic state space includes coordinates from the following six dimensions: the three spatial dimensions (x, y, z), time, frequency, and polarization direction.

In one embodiment, the electromagnetic state space includes coordinates from the following eight dimensions:

the three spatial dimensions (x, y, z), time, frequency, polarization direction, orthogonal code, and amplitude.

In one embodiment, the method further comprises: if all of the nodes within the plurality of nodes fit within the electromagnetic state space without overlap: determining whether to squeeze the nodes tighter together within the electromagnetic state space; and reducing a standoff range of the radar node if a determination is made to squeeze the nodes tighter together.

In accordance with another aspect of the concepts, systems, circuits, and techniques described herein, a radar system comprises: a radio frequency (RF) transmitter; an RF receiver; and at least one processor to allow the radar system to operate within an electromagnetic state space with one or more other nodes without overlap between nodes, the at least one processor configured to: identify a plurality of nodes to operate within the electromagnetic state space, the plurality of nodes including the radar system and at least one other node; estimate an electromagnetic volume of each node within the plurality of nodes; attempt to fit the estimated electromagnetic volumes of the plurality of nodes within the electromagnetic state space without overlap, wherein the attempt to fit includes modification of transmit parameters associated with one or more nodes; and if the electromagnetic volumes of the plurality of nodes do not fit within the electromagnetic state space without overlap: determine a reduced electromagnetic volume for the radar node that will allow the radar node to achieve at least a minimum effectiveness level; and repeat the attempt to fit the estimated electromagnetic volumes of the plurality of nodes within the electromagnetic state space without overlap.

In one embodiment, the at least one processor is further configured to: before repeating the attempt to fit the estimated electromagnetic volumes within the electromagnetic state space, determine a reduced electromagnetic volume for each directly controllable node within the plurality of nodes, other than the radar node, that will allow the controllable node to achieve at least a minimum effectiveness level.

In one embodiment, the at least one processor is further configured to: if the electromagnetic volumes of the plurality of nodes do not fit within the electromagnetic state space without overlap after multiple iterations of determining reduced electromagnetic node volumes, removing one or more of the plurality of nodes from the electromagnetic state space.

In accordance with a still another aspect of the concepts, systems, circuits, and techniques described herein, a machine-implemented method for operating a radar system within a multi-dimensional electromagnetic state space, comprises: identifying a plurality of nodes to operate within the electromagnetic state space, the plurality of nodes including a radar node and at least one other node; determining a capacity of the electromagnetic state space; assigning an importance value to each node in the plurality of nodes; estimating an electromagnetic volume of each node within the plurality of nodes; ranking the plurality of nodes based on value density; identifying a minimum number of highest ranking nodes within the plurality of nodes that will exceed the capacity of the electromagnetic state space; attempting to fit electromagnetic volumes associated with less than the minimum number of highest ranking nodes into the electromagnetic state space without overlap, wherein attempting to fit includes modifying transmit parameters associated with one or more nodes; and if the electromagnetic volumes associated with the less than minimum number of highest ranking nodes do not fit within the electromagnetic state space without overlap: removing at least one overlapping node from the electromagnetic state space and adding at least one other node to the electromagnetic state space to form a modified group of nodes; and attempting to fit electromagnetic volumes associated with the modified group of nodes into the electromagnetic state space without overlap.

In one embodiment, the method further comprises: repeating removing at least one overlapping node and adding at least one other node and attempting to fit electromagnetic volumes associated with the modified group of nodes into the electromagnetic state space without overlap until a maximum number of nodes have been inserted into the state space without overlap.

In one embodiment, removing at least one overlapping node from the electromagnetic state space includes removing a lowest ranking overlapping node.

In one embodiment, the method further comprises: if the electromagnetic volumes of all nodes within the plurality of nodes cannot be fit into the electromagnetic state space without overlap: determining a reduced electromagnetic volume for the radar node that will allow the radar node to achieve at least a minimum effectiveness level; and repeating ranking the plurality of nodes based on value density; identifying a minimum number of highest ranking nodes within the plurality of nodes that will exceed the capacity of the electromagnetic state space; and attempting to fit electromagnetic volumes associated with less than the minimum number of highest ranking nodes into the electromagnetic state space without overlap.

In one embodiment, the method further comprises: before repeating ranking the plurality of nodes, determining a reduced electromagnetic volume for each directly controllable node within the plurality of nodes, other than the radar node, that will allow the controllable node to achieve at least a minimum effectiveness level.

BRIEF DESCRIPTION OF THE DRAWINGS

The foregoing features may be more fully understood from the following description of the drawings in which.

DETAILED DESCRIPTION

Figure 1:
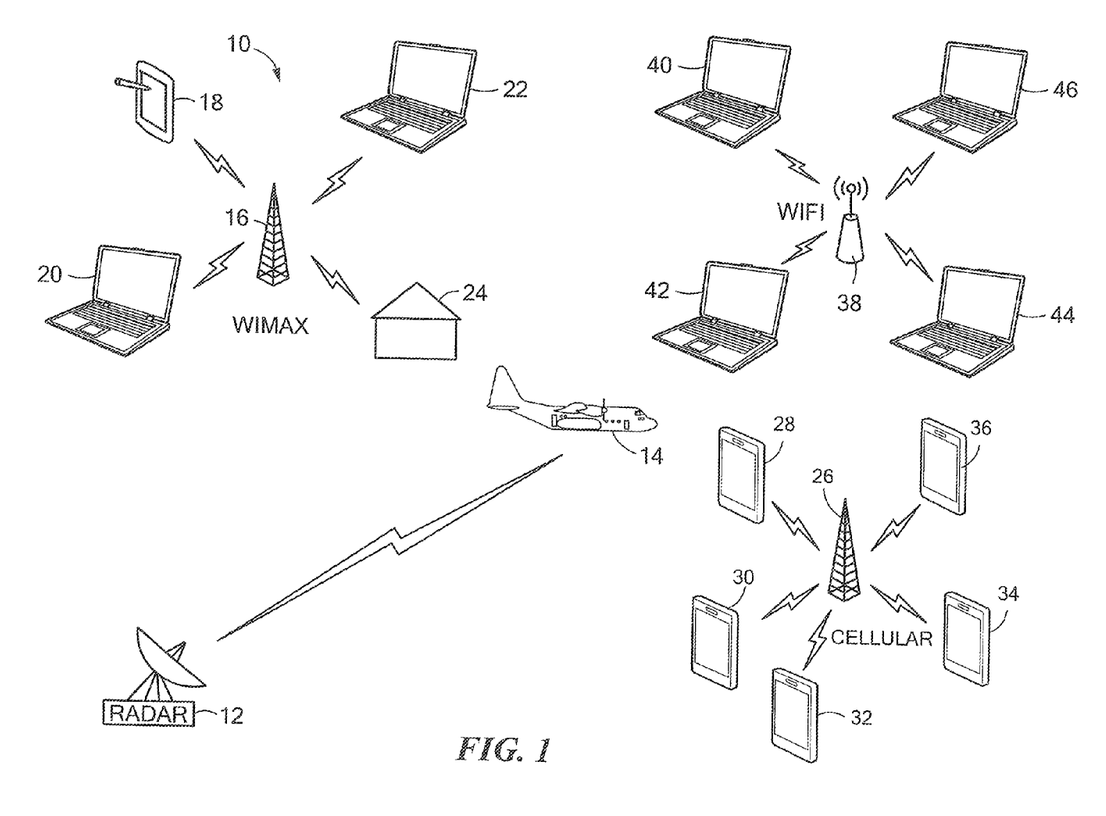
FIG. 1 is a diagram illustrating an environment within which a radar system may be called upon to operate.

FIG. 1 is a diagram illustrating a exemplary environment 10 within which a radar system 12 may have to operate. The radar system 12 may be deployed to search for and/or track targets 14 within or proximate to the environment 10. A plurality of other radio frequency (RF) nodes may also be operative within the environment 10. For example, one or more Worldwide Interoperability for Microwave Access (WiMAX) base stations 16 may be operative within the environment 10 to provide wireless communication services for one or more mobile or stationary subscriber stations 18, 20, 22, 24. Likewise, one or more cellular telephone base stations 26 may be operative within the environment to provide communication services to a plurality of cellular telephone users 28, 30, 32, 34, 36. In addition, one or more wireless fidelity (WiFi) wireless access points 38 may be operative within the environment 10 to provide network access for one or more user stations 40, 42, 44, 46. Other types of RF nodes may alternatively be present. Some of the RF nodes within the environment 10 may operate within the same portions of the electromagnetic spectrum as the radar system 12. It would be beneficial if the radar system 10 could operate in an effective manner within the environment 10 while having little or no effect on the other RF nodes operating therein. As used herein, effective operation for a radar system refers to the ability to achieve a given probability of detection with less than a given probability of false alarm.

Techniques, systems, and devices are provided herein that are capable of allowing a radar system (or any other type of RF system) to assess an electromagnetic environment in a region of interest and to operate within that environment in an effective and efficient manner. The techniques, systems, and devices may define an electromagnetic state space within which the radar system is to operate and then determine electromagnetic volumes for each of the nodes to operate therein. The electromagnetic volumes may then be "packed" into the electromagnetic state space in a manner that produces little or no "overlap" between nodes. This process may be repeated as time progresses so that the electromagnetic state space in continually updated to pack the node volumes in a highly efficient manner. As will be described in greater detail, the process of packing the node volumes may include modifying operational parameters of one or more of the nodes to permit more nodes to fit within the volume. Ideally, the radar system will be able to operate alongside all of the other nodes that are currently occupying the state space. In some embodiments, however, techniques may be used to move one or more nodes out of the state space in certain circumstances. In some implementations, the techniques, systems, and methods described herein may be used to achieve near optimal packing results in polynomial time.

As described previously, a given node's volume may be defined by its set of coordinates along d-dimensions. Two nodes (e.g., node A and node B) may be considered to be "overlapping" if the sum of volume that the nodes co-occupy in the d-dimensional state space is greater than a given threshold. For example, in one possible implementation, an overlap threshold may be defined as a 5% co-occupied volume. In this case, two nodes will be considered overlapping if they have greater than a 5% co-occupied volume. Thus, if node A and node B have substantially the same coordinates (volume normalized to unity) except for the amplitude coordinate, and the amplitude associated with node A is only 4% of the amplitude of node B, then these nodes would be determined to not be overlapping.

Figure 2:
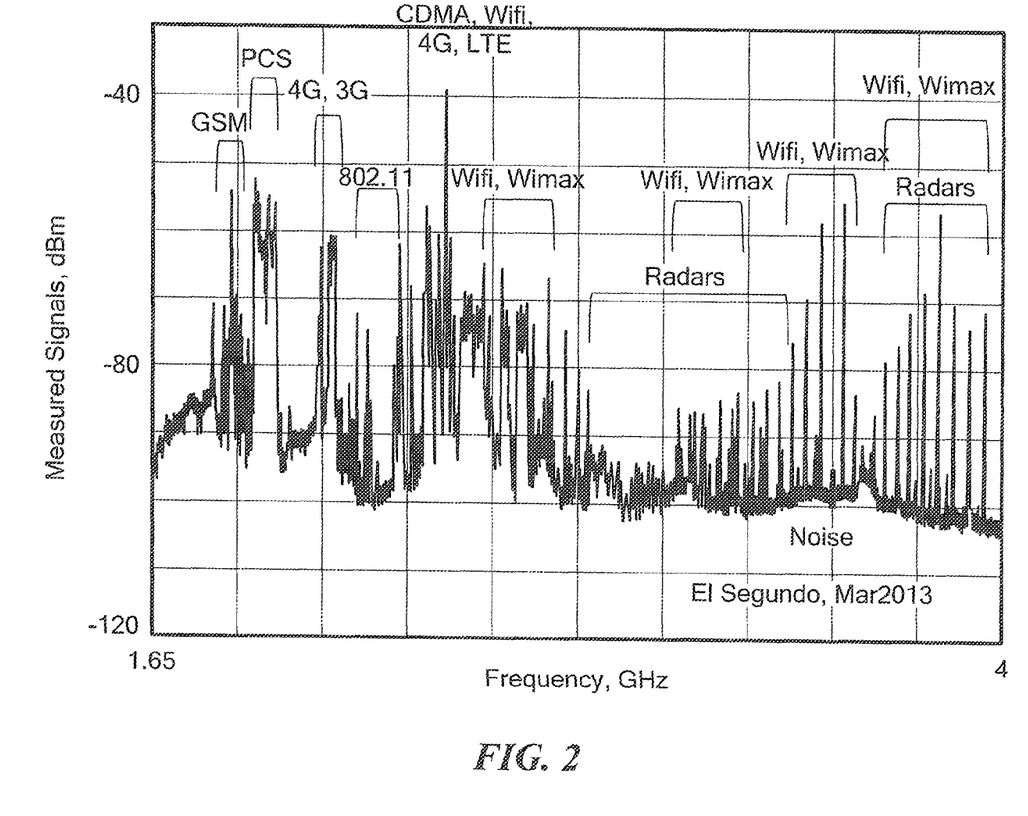
FIG. 2 is a diagram illustrating an actual measured electromagnetic spectrum within a region of interest at a particular point in time.

FIG. 2 is a spectrum diagram illustrating actual measured spectrum use within a region of interest. As shown, signal components exist within the electromagnetic spectrum that are associated with a large number of different RF systems. As shown, these systems may include, for example, one or more of the following: a GSM system, a PCS system, a 3G or 4G cellular system, a WiFi system (IEEE 802.11), a WiMax system (IEEE 802.16), a CDMA system, and LTE cellular system, and various radar systems. Other types of RF systems are also possible. The actual systems that are active within an environment of interest will typically vary with time. Some of these systems may create harmful interference in the other systems that compromise system performance. In addition, these systems may be arranged within the region of interest in a very inefficient manner that does not make efficient use of the available electromagnetic resources. Techniques described herein may be used to increase the efficiency with which the electromagnetic resources are utilized and also to reduce or eliminate overlap between different nodes in the environment. As will be described in greater detail, for embodiments that involve a radar system, techniques are provided that allow a standoff range to be determined for use between the radar system and other commercial systems within the environment that will allow all nodes to operate effectively.

Figure 3:
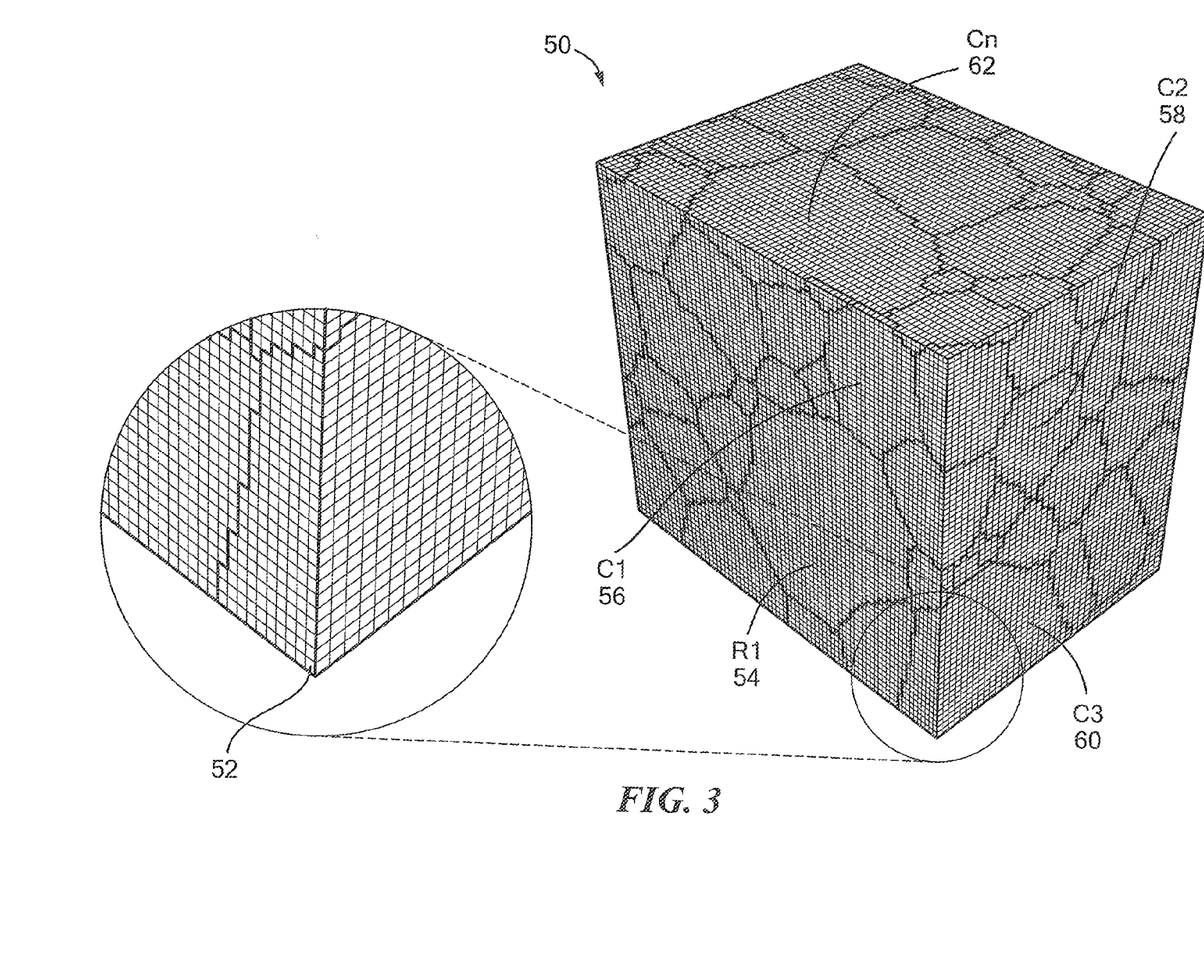
FIG. 3 is an exemplary representation of a multi-dimensional electromagnetic state space that has been packed in accordance with an embodiment.

FIG. 3 is an exemplary representation of a multi-dimensional electromagnetic state space 50 that has been packed in accordance with an embodiment. The electromagnetic state space 50 is illustrated with three dimensions for ease of illustration. However, any number of dimensions may be present (e.g., 5 or more, etc.) in different implementations. The dimensions in FIG. 3 might include, for example, coordinates from the spatial dimensions x, y, and z, but other combinations are also possible. As shown, the electromagnetic state space 50 is divided into a multitude of volume "bins" 52 in each of the three (or more) dimensions. All of the bins 52 together form the state space 50. In some embodiments, the electromagnetic state space 50 may have a unity volume (i.e., the volume of the state space 50 is normalized to one). Thus, the individual volumes of the three dimensional bins 52 may add up to one in some implementations.

As shown in FIG. 3, a radar node R1 and a number of communication nodes C1, C2, C3, . . . , Cn are packed into the electromagnetic state space 50. In the case where each node i occupying the state space 50 may have a corresponding d-dimensional normalized volume, $\hat{a}_i$, where the nodes' state space is represented by a vector, such that each dimension is represented by a scalar coordinate where:

$$\hat{a}_i = \|\alpha_i^2, \alpha_i^2, \ldots, \alpha_i^d\|.$$

In other cases, where each node in the state space is represented by a d-dimensional set of coordinates, other functions may be used to compute the node volume such as dividing the state space up into finite elements and computing the volume as summing the elements in the space that the node occupies. The normalized node volumes are packed into the unit sized electromagnetic state space 50 in a manner that results in no overlap. Thus, referring to FIG. 3, radar node R1 may have a node volume 54, communication node C1 may be have a node volume 56, communication node C2 may be have a node volume 58, communication node C3 may be have a node volume 60, communication node Cm may be have a node volume 62, and so on. In addition, these node volumes will typically change with time based on the operational needs of the various nodes in the environment, as well as the entry and exit of nodes to/from the state space 50. As will be described in greater detail, the shapes of some of the various node volumes 54, 56, 58, 60, 62 may also adapt over time. One or more control nodes (or other control units) may be provided that are operative for packing the node volumes into the state space in an efficient manner.

As described previously, in some implementations, the node volumes 54, 56, 58, 60, 62 represent electromagnetic volumes used to perform some task or mission associated with a corresponding node. For example, a first communication node may need to transmit a packet to a second communication node at a particular point in time. The first communication node may desire a certain "electromagnetic volume" to communicate that packet to the second communication node. This electromagnetic volume may be used as the node volume for packing purposes. As used herein, the term "electromagnetic volume" is used in a broad sense to encompass an extent of all different electromagnetic dimensions being used by each node in a particular implementation. For example, in a simpler case, the electromagnetic volume may represent the physical volume occupied by a transmit antenna beam between a first communication node and a second communication node during a wireless packet transfer operation. As is well known, a transmit antenna beam may have a beam width in both azimuth and elevation. A transmit antenna beam may also have a maximum range based, at least in part, on a power level used to transmit a corresponding signal. Thus, the beam (or the corresponding node) may be considered to occupy a certain defined volume in physical space.

The electromagnetic volume of a node is not limited to 3-dimensional physical volume as described above, but may include other electromagnetic dimensions in various implementations. For example, frequency may be taken as one of the dimensions of an electromagnetic volume. Thus, two different communication links may be operative within a common physical space if their operational frequency ranges do not overlap. Likewise, polarization direction may be used as a dimension of an electromagnetic volume. Thus, even if there is commonality in both physical and frequency dimensions between two communication links, overlap can still be avoided by using different polarization directions for the links. Another possible dimension may be orthogonal codes. For example, in a code division multiple access (CDMA) system, two users may occupy the same physical space and the same frequency band if they each use a different orthogonal code during transmission. The data associated with the corresponding signals may then be extracted from the signals in a receiver by performing a correlation operation using a replica of the relevant code. Time is another possible dimension of an electromagnetic volume. Typically, as described above, time may be accounted for by the fact that the configuration of the electromagnetic volume 50 may adapt from instant to instant. Other dimensions may also be considered as part of the overall electromagnetic volume in some implementations.

In some embodiments, a radar system node may act as a controller node to determine which nodes will operate within an electromagnetic state space. The radar system node may also determine how the various nodes will be packed within the state space. As described previously, the FCC plans on auctioning off licenses to various portions of the electromagnetic spectrum that were traditionally reserved for use by military radar systems. These licenses will most likely be acquired by one or more commercial wireless networking or wireless cellular communications carriers or other commercial entities. In the future, therefore, a military radar system may be called upon to operate within an electromagnetic state space that is already occupied by one or more other wireless nodes/users. Thus, in some implementations, various features described herein may be used by a radar system node to allow the node to operate within a state space that is already occupied by one or more other nodes. The other nodes can be commercial nodes, military nodes, or a combination of the two. In some embodiments, features described herein may be used by a radar system node to pack a number of different nodes/users within an electromagnetic state space in an efficient manner, so that a large number of nodes can operate concurrently within the space with little or no overlap.

Although described in various places herein in the context of a radar system, it should be appreciated that the concepts and features described herein are not limited to use with radar systems or military systems. On the contrary, features described herein may be used in many different contexts to achieve efficient utilization of electromagnetic resources with little or no overlap. In some embodiments, techniques are provided that enable near-optimal packing to be achieved within an electromagnetic state space with no overlap.

Figure 4:
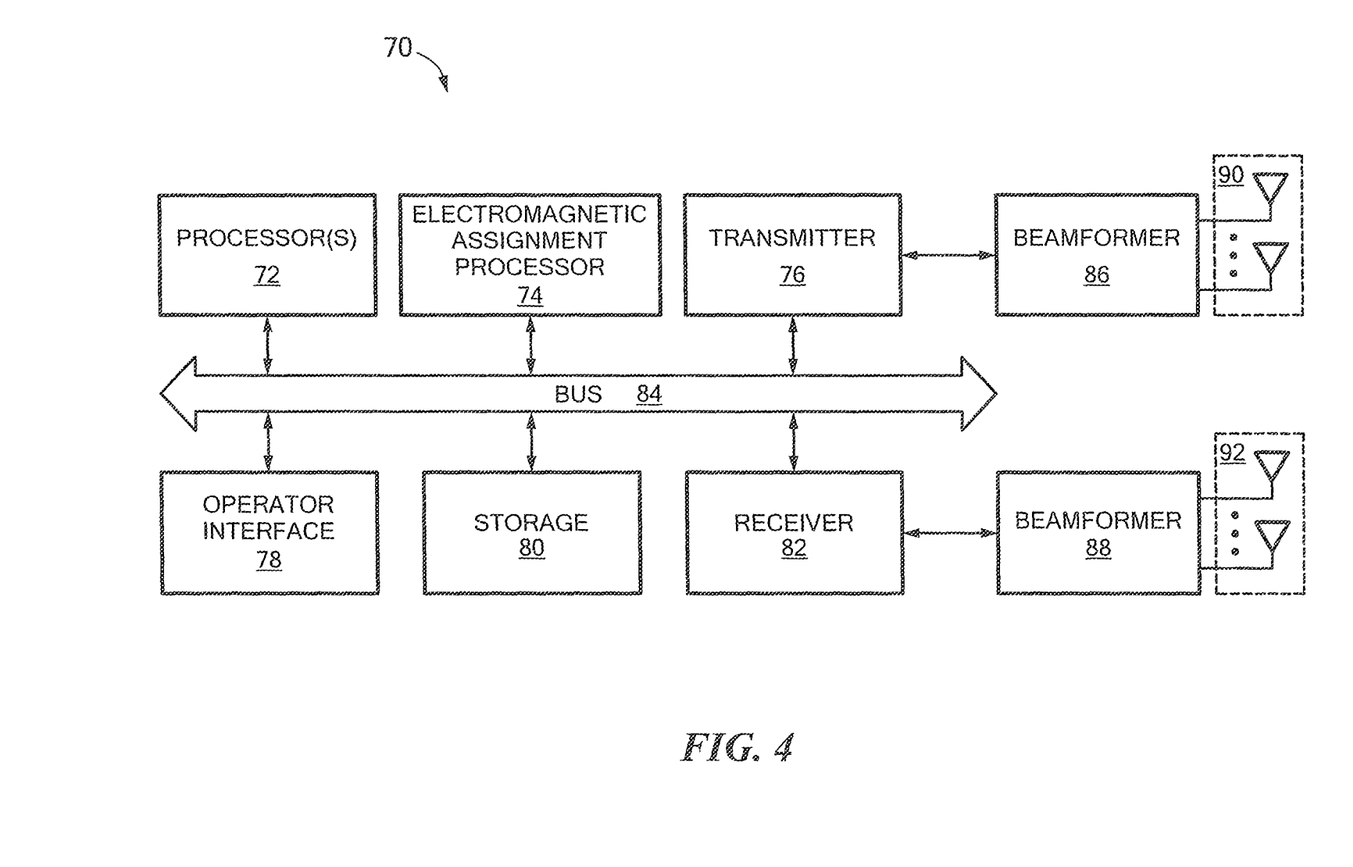
FIG. 4 is a block diagram illustrating a radar system architecture that may be used within a radar system node in accordance with an embodiment.

FIG. 4 is a block diagram illustrating a radar system architecture 70 that may be used within a radar system node in accordance with an embodiment. As illustrated, the radar system architecture 70 may include: one or more digital processors 72, an electromagnetic assignment processor 74, a radar transmitter 76, an operator interface 78, digital storage 80, and a radar receiver 82. The radar transmitter 76 may be coupled to a transmit antenna 90 through a transmit beamformer 86 and the radar receiver 82 may be coupled to a receive antenna 92 through a receive beamformer 88. A bus 84 and/or other structure(s) may be provided for establishing interconnections between various components of the radar system architecture 70. The digital processor(s) 72 may include one or more digital processing devices that are capable of executing programs and/or procedures to provide functions and/or services for a radar system operator. The electromagnetic assignment processor 74 may include a digital processing device that is configured to identify nodes occupying an electromagnetic state space in which the radar system wishes to operate and to perform electromagnetic packing functions to pack the identified nodes within the state space in an efficient manner. Although illustrated as a separate unit, in some embodiments, some or all of the functions associated with the electromagnetic assignment processor 74 may, instead, be performed within the processor(s) 72.

Digital storage 80 may include one or more digital data storage systems, devices, and/or components that may be used to store data and/or programs for other elements of the radar system architecture 70. Operator interface 78 may include any type of device, component, or subsystem for providing an interface between an operator and the radar system. Radar transmitter 76 and radar receiver 82 may include any type of wireless transmitter and receiver that are capable of transmitting a desired radar waveform and receiving a corresponding return signal from a target, respectively. Although illustrated as separate units, it should be appreciated that the transmitter 76 and the receiver 82 may be implemented as a single transceiver unit. As shown in FIG. 4, radar transmitter 76 may be coupled to a transmit antenna 86 and radar receiver 82 may be coupled to a receive antenna 88. Although not shown, these antennas may also include beam steering and/or beam shaping functionality. In some embodiments, the transmit and receive functions may share a common antenna by utilizing an appropriate antenna sharing device (e.g., a duplexer, a switch, a circulator, etc.). In at least one embodiment, one or more electronically steerable array antennas may be used.

Digital processor(s) 72 may include, for example, one or more general purpose microprocessors, digital signals processors (DSPs), controllers, microcontrollers, application specific integrated circuits (ASICs), field programmable gate arrays (FPGAs), programmable logic arrays (PLAs), programmable logic devices (PLDs), reduced instruction set computers (RISCs), complex instruction set computers (CISCs), multi-core processors, processor complexes, and/or other processing devices or systems, including combinations of the above. Digital processor(s) 72 may be used to, for example, execute an operating system for a corresponding radar node. Digital processor(s) 72 may also be used to, for example, execute one or more application programs for the radar node. In addition, digital processor(s) 72 may be used to implement, either partially or fully, one or more radar functions for the radar system node. This may include, for example, radar waveform generation, beam steering, beam shaping, target acquisition, target tracking, return signal analysis, and/or other functions. In some embodiments, the digital processor(s) 72 and/or the electromagnetic assignment processor 74 may be used to implement some or all of the techniques described herein for packing an electromagnetic state space in an efficient manner (e.g., the methods of FIGS. 5-8, etc.).

Digital storage 80 may include any type of system, device, or component, or combination thereof that is capable of storing digital information (e.g., digital data, computer executable instructions and/or programs, etc.) for access by processing devices or other components. This may include, for example, semiconductor memories, magnetic data storage devices, disc based storage devices, optical storage devices, read only memories (ROMs), random access memories (RAMs), non-volatile memories, flash memories, USB drives, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, and/or other digital storage suitable for storing electronic instructions and/or data.

It should be appreciated that the radar system architecture 70 of FIG. 4 represents one possible example of an architecture that may be used in an implementation. Other architectures may alternatively be used. As used herein, the term "node device" or "node" is used to describe any type of digital electronic device or system that includes some form of wireless transmit and/or receive capability. This may include, for example, a laptop, desktop, notebook, or tablet computer; a personal digital assistant (PDA); a personal communication service (PCS) device; a personal navigation assistant (PNA); a cellular telephone, smart phone, or other wireless communication device; a wireless base station; a wireless access point; a mobile wireless transceiver; a pager; a wireless sensor device; a satellite communication device or system; a radar device or system; a media player having communication capability; a digital storage device with wireless communication capability; and/or other devices and systems. It should be appreciated that all or part of the various devices, processes, or methods described herein may be implemented using any combination of hardware, firmware, and/or software.

FIGS. 5-8 include flow diagrams showing processes for operating a radar system within an electromagnetic state space that is also occupied by one or more other nodes in accordance with various embodiments.

The rectangular elements in the flow diagrams (typified by element 102 in FIG. 5) are herein denoted "processing blocks" and may represent computer software instructions or groups of instructions. It should be noted that the flow diagrams of FIGS. 5-8 represent two exemplary embodiments of designs described herein and variations in such diagrams, which generally follow the processes outlined, are considered to be within the scope of the concepts, systems, and techniques described and claimed herein.

Alternatively, the processing blocks may represent operations performed by functionally equivalent circuits such as a digital signal processor circuit, an application specific integrated circuit (ASIC), a field programmable gate array (FPGA), or other circuitry. Some processing blocks may be manually performed while other processing blocks may be performed by a processor or other circuit. The flow diagrams do not depict the syntax of any particular programming language. Rather, the flow diagrams illustrate the functional information one of ordinary skill in the art requires to fabricate circuits and/or to generate computer software and/or configuration information to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the processes described below are unordered meaning that, when possible, the sequences shown in FIGS. 5-8 can be performed in any convenient or desirable order.

Figure 5:
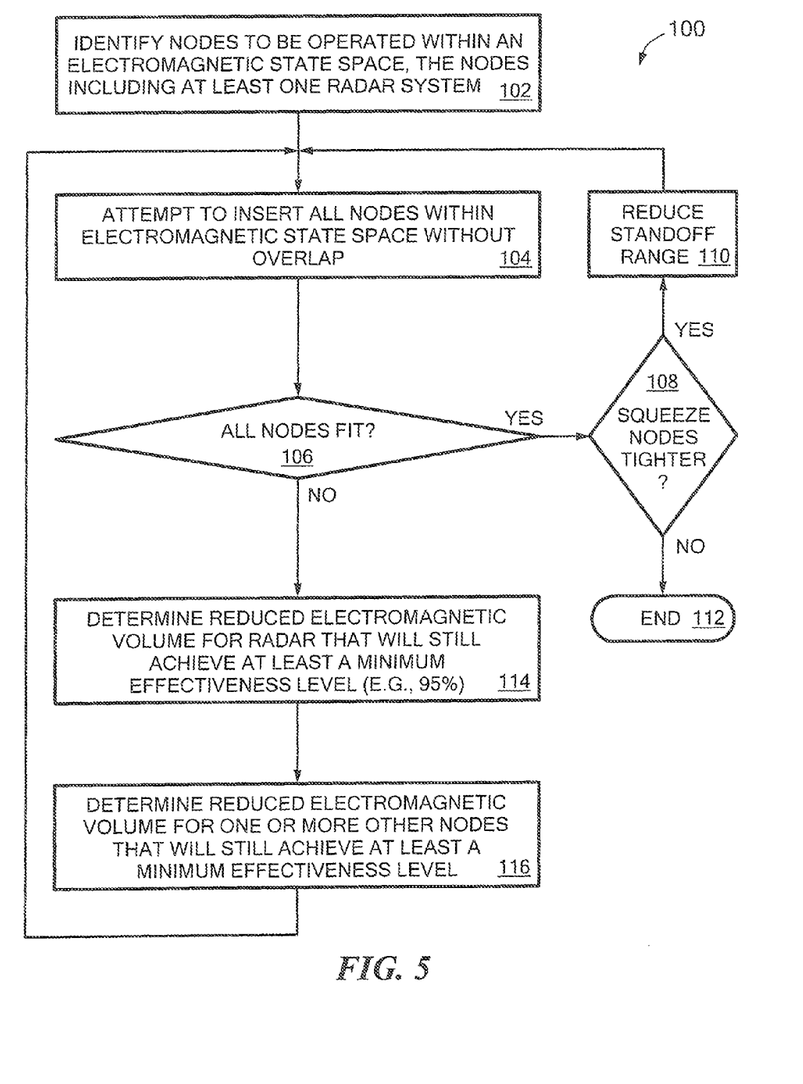
FIG. 5 is a flowchart illustrating a method for operating a radar system within an electromagnetic state space that is also occupied by one or more other nodes in accordance with an embodiment.

FIG. 5 is a flowchart illustrating an exemplary method 100 for operating a radar node within an electromagnetic state space that is also occupied by one or more other nodes in accordance with an embodiment. The method 100 may be practiced within or in association with, for example, a radar system node to be operated within the state space (e.g., within processor(s) 72 and/or electromagnetic assignment processor 74 of FIG. 4, etc.). In one possible scenario, the method 100 may be initiated in response to a decision to operate a radar within a particular region of interest (e.g., a particular city, etc.). The method 100 may then be used to identify other wireless nodes operating within the region of interest and to determine how to fit all of the nodes (including the radar node) within a corresponding electromagnetic state space with little or no overlap between nodes, to the extent possible. The electromagnetic state space is a multi-dimensional state space that may be determined based on, for example, the particular needs of the radar system of interest. The electromagnetic state space may include any number of dimensions. The dimensions may include some combination of the following: the three spatial dimensions (x, y, z); frequency; polarization direction; time; and orthogonal code. Other dimensions are also possible. The electromagnetic state space may include a physical space (e.g., the airspace around New York City, etc.) as well as other dimensional ranges (e.g., frequency ranges, polarizations, etc.) in some embodiments. In some implementations, electromagnetic node volumes are packed within a 6-dimensional state space consisting of the three spatial dimensions; frequency; polarization; and time. In some other implementations, electromagnetic node volumes are packed within a 7-dimensional state space consisting of the three spatial dimensions; frequency; polarization; time; and orthogonal code. Other dimensional combinations may alternatively be used.

As shown in FIG. 5, the method 100 may first identify nodes to be operated within the electromagnetic state space (block 102). The nodes to be operated within the electromagnetic state space will include the radar system of interest as well as the other nodes that are currently operating within (or plan to operate within) the state space. The identified nodes may include, for example, one or more commercial communication nodes and/or one or more other military nodes (e.g., military communications nodes, etc.). In some embodiments, the identified nodes may also include, for example, one or more jammer nodes or malfunctioning nodes operating within the state space. For each identified node, a corresponding electromagnetic volume may be estimated. The electromagnetic volume may be defined with respect to a center location of the node (e.g., in frequency, space, etc.).

The nodes that are currently occupying the state space may be identified in a number of different ways. For example, in one approach, nodes may be identified by sensing signals propagating within the electromagnetic state space. Such signals will often include information that enable one to determine a corresponding wireless or cellular standard that the signal is associated with. Once the standard is known, information may be estimated relating to certain transmit parameters of the corresponding transmitting node (e.g., using knowledge of the underlying standard). This knowledge may allow a d-dimensional normalized volume $\hat{\alpha}_i$ to be estimated for the node. This may be done for each detected signal. Alternatively, or on addition, some communication nodes may be configured to self report current or future operational states. These operational states may be also be used to determine normalized volumes for corresponding nodes.

In another approach, other nodes within a state space may be identified by consulting a database where users may register for bandwidth and other electromagnetic resources. Such databases may include, for example, various white space databases operated by companies such as Google and Ericsson. These databases typically include frequency and location allocations. In some embodiments, databases of this type may be developed that operate with a larger number of electromagnetic dimensions. These databases may allow users to register for, for example, particular polarizations, orthogonal codes, time periods, etc. Such databases can be checked to determine whether any nodes have registered to operate within an electromagnetic state space for a particular time period. If nodes are found, information may be retrieved from the database that will allow a d-dimensional normalized volume $\hat{\alpha}_i$ to be estimated for each associated node.

In still another technique, a device or system with a high amount of processing power may be capable of listening to a surrounding environment to determine detailed information about nodes that are currently transmitting within an electromagnetic state space. Such systems may be able to measure parameters such as, for example, angle of arrival, frequency, polarization, code, etc. based on signals sensed by a local receiver. One type of device or system that can perform this type of function is known as a radar warning receiver (RWR). Therefore, an RWR or similar device that is capable detecting transmitting military and commercial nodes and of characterizing the corresponding signals may be used in some embodiments. The information collected in this fashion can be used to calculate or estimate normalized volumes $\hat{a}_i$ for the corresponding nodes. As will be appreciated, any of the above techniques may be used individually to identify nodes and corresponding electromagnetic volumes in an electromagnetic state space of interest. In some embodiments, combinations of the above techniques may be used to determine node information. Other techniques may alternatively be used.

After nodes and corresponding electromagnetic volumes have been identified, an attempt may be made to insert or fit all of the identified nodes within the electromagnetic state space without overlap (block 104). Some of the nodes within the state space may be directly controllable to some extent by the radar system. For these nodes, one or more operating parameters of the node may be modified by the radar system as part of the insertion process. Thus, for example, the radar system may directly instruct (or request) one or more controllable nodes to use a certain frequency band, polarization direction, spatial layout, orthogonal code, transmit power level, data rate, etc. within the state space. Other nodes within the state space may not be directly controllable by the radar node. These nodes may be inserted into the state space in their current states. Typically, a military radar may have some control over other military nodes within a state space. However, military radars usually do not have any direct control over commercial nodes in a state space.

It may next be determined whether all of the nodes were successfully fit within the state space without overlap (block 106). If the nodes all fit (block 106-Y), it may next be determined whether the nodes are to be squeezed tighter together within the electromagnetic state space (block 108). If the nodes are squeezed tighter together, more room may be opened up within the state space to insert additional nodes. Thus, electromagnetic state space will be utilized more efficiently. If the nodes are not to be squeezed tighter together (block 108-N), the method 100 may be terminated (block 112). If this occurs, the node parameters at this time will be used for all of the nodes. If the nodes are to be squeezed tighter together (block 108-Y), the standoff range of the radar system may next be reduced (block 110). The standoff range is a margin value associated with the radar system that dictates how close the radar may be operated with respect to commercial nodes to prevent interference with such systems. The standoff range may be reflected within the node volumes of the radar system and the various nodes. After the standoff range has been reduced, the method 100 may return to block 104 and an attempt to insert all nodes into the state space may be repeated.

In some embodiments, there may be a maximum number of times (e.g., one or more times) that a decision to squeeze the nodes tighter may be made after all nodes have been fit within the electromagnetic state space. Thus, the method 100 may automatically terminate (block 112) after the maximum number of times has been reached in some implementations.

Returning now to block 106, if all of the nodes cannot be fit within the electromagnetic state space without overlap (block 106-N), a reduced electromagnetic volume may be determined for the radar node that will still allow the radar to achieve at least a minimum effectiveness level (block 114). The reduced electromagnetic volume may be achieved by, for example, reducing a transmit beamwidth of the radar, reducing a transmit power level of the radar, and/or modifying some other transmit parameter or combination of transmit parameters of the radar. In some embodiments, well-known space time adaptive processing (STAP) techniques may be used by the radar node to reduce the electromagnetic volume thereof. Other techniques may also, or alternatively be used. In some embodiments, the minimum effectiveness level may be represented as some fraction of a normal performance level of the radar (e.g., 95%, etc.). A reduced electromagnetic volume may also be determined for one or more other nodes in the state space that will allow the nodes to achieve at least a minimum effectiveness level (block 116). In some embodiments, this will only involve nodes that are directly controllable by the radar node. The other nodes may use the same minimum effectiveness level as the radar node or different values.

After the electromagnetic volumes of nodes have been reduced in blocks 114 and 116, the method 100 may return to block 104 and an attempt to insert all nodes into the state space may be repeated. If the nodes again do not fit, blocks 114 and 116 may be repeated until all of the nodes fit. In blocks 114 and 116, the electromagnetic volume associated with the corresponding nodes may be reduced to the point that achieves the minimum effectiveness level in one step or over multiple steps or iterations.

If further reduction of the electromagnetic volumes of the nodes is not possible (because, for example, the minimum effectiveness has been reached), then one or more of the other nodes may be completely removed from the electromagnetic state space in block 116. After one or more nodes have been removed from the state space, the method may return to block 104 and an attempt to insert the remaining nodes into the state space may be repeated. Eventually all remaining nodes will be able to fit within the electromagnetic state space (block 106-Y).

As described previously, some of the nodes in the state space may be directly controllable by the radar node (i.e., controllable using commands, instructions, or requests) and others may not. Thus, in block 116, reduced electromagnetic volumes may first be determined for one or more nodes that are directly controllable. If this does not allow all of the nodes to fit within the electromagnetic state space, one or more controllable nodes may be instructed to leave the state space in block 116. Alternatively, or in addition, the radar system may decide to remove one or more of the non-controllable nodes from the state space using an "indirect" control technique. For example, in one approach, the radar system may direct a high power beam toward a non-controllable node to force the node to move from the state space or to cease transmitting. After one or more nodes have been removed in this fashion, the method may return to block 104 and an attempt to insert the remaining nodes into the state space may be repeated.

Figure 6:
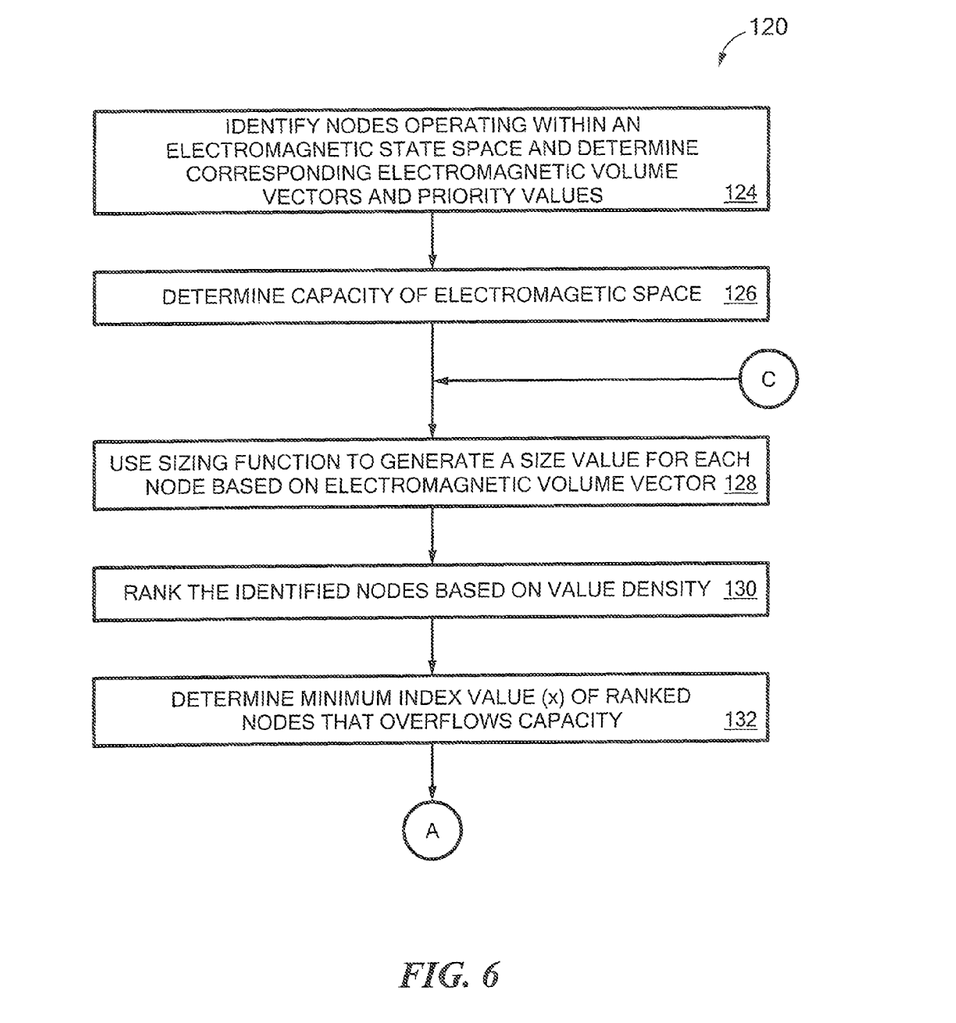
FIGS. 6-8 are portions of a flowchart illustrating another method for operating a radar system within an electromagnetic state space that is also occupied by one or more other nodes in accordance with an embodiment.
Figure 7:
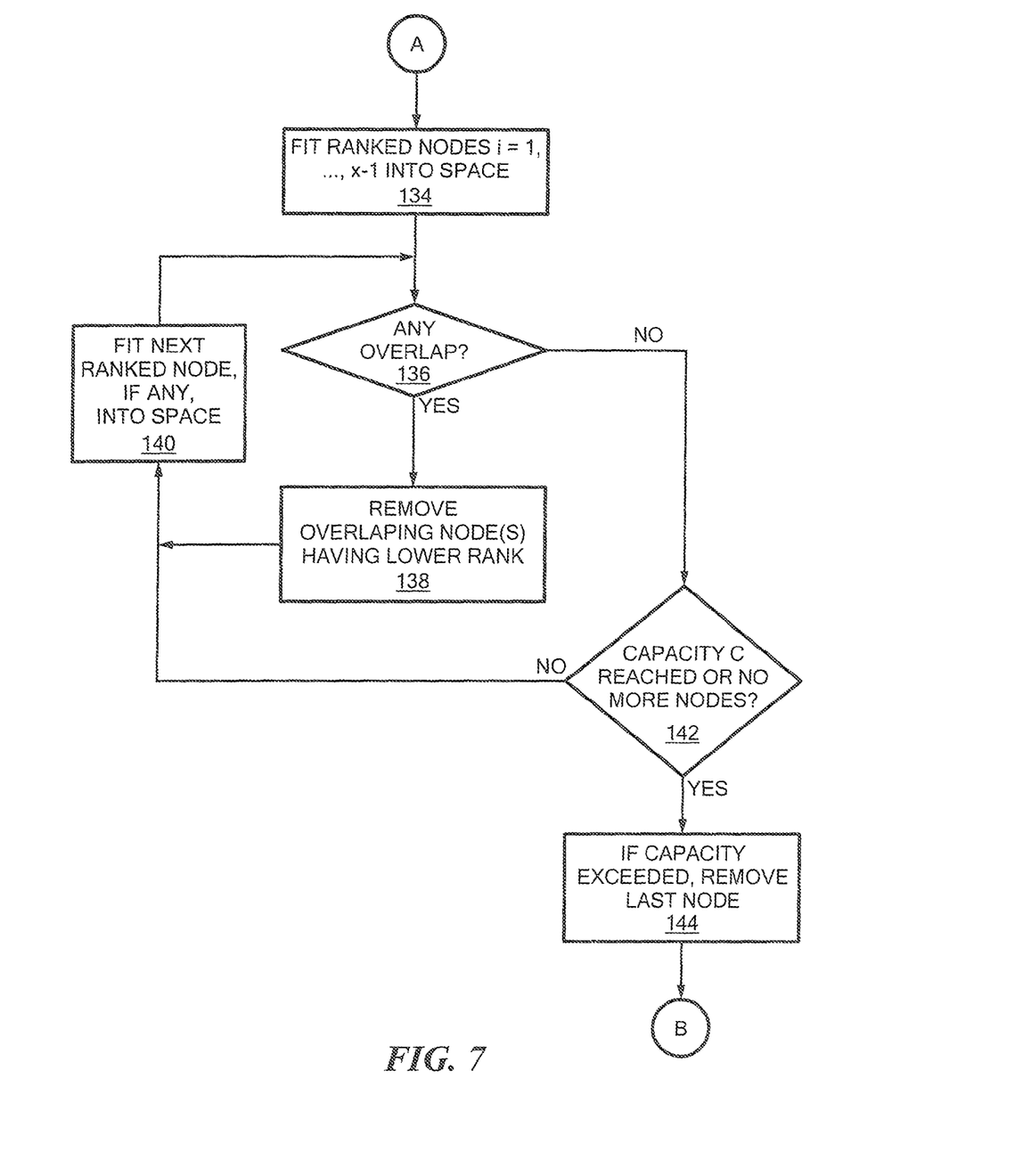
Figure 8:
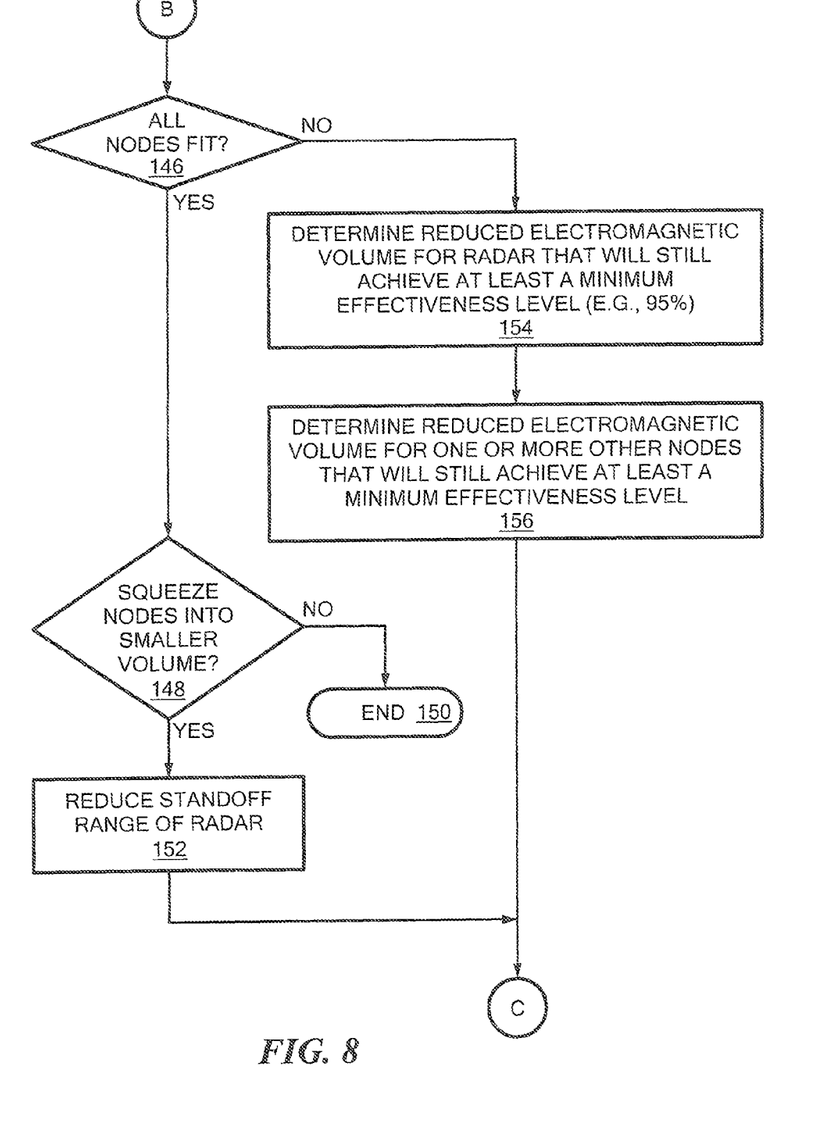

FIGS. 6-8 are portions of a flowchart illustrating another exemplary method 120 for operating a radar node within an electromagnetic state space that is also occupied by one or more other nodes in accordance with another embodiment. Nodes operating within an electromagnetic state space may first be identified and corresponding d-dimensional normalized electromagnetic volumes $\hat{\alpha}_i$ may be determined for the nodes (block 124). Techniques for identifying nodes and corresponding electromagnetic volumes $\hat{\alpha}_i$ have been described above. Importance values or priority values may also be determined for the identified nodes at this point. The importance (or priority) values will depend on the relative importance of the nodes. As will be described in greater detail below, these importance values may be used to determine an order in which the nodes will be inserted into the state space. In a simplest approach, a binary importance value scheme may be used where, for example, commercial nodes are given an importance value of 1 and military nodes are given an importance value of 2 (the higher value implying higher importance). In other embodiments, a more complex priority or importance scheme may be used.

A capacity (C) of the electromagnetic state space may also be determined (block 126). Techniques for determining theoretical capacity of a state space are well known in the art. As will be appreciated, the capacity will depend, at least in part, on the number and type of dimensions used to define the state space.

As described above, a normalized electromagnetic volume $\hat{\alpha}_i$ may be determined for each of the nodes to be operated within the state space. The electromagnetic volume $\hat{\alpha}_i$ may have the form $\hat{\alpha}_i = (\hat{\alpha}_i^1, \hat{\alpha}_i^2, \ldots, \hat{\alpha}_i^d)$. A sizing function may next be used to develop a scalar volume value (or size) for each of the identified nodes based on the corresponding normalized electromagnetic volume $\hat{\alpha}_i$ (block 128). In one approach, a simple dot product may be used as a sizing function (e.g., a dot product of the normalized electromagnetic volume $\hat{\alpha}_i$ with itself, etc.). Other sizing functions may alternatively be used. The various identified nodes may next be ranked based on "value density" (block 130). Value density may depend, for example, on the importance value of the node and the corresponding scalar volume value. For example, in one embodiment, the value density may be computed as a ratio of the importance value to the scalar volume size. Using this approach, the nodes may be ranked in order as follows:

$$\frac{v_1}{f(\hat{a}_1)} \geq \frac{v_2}{f(\hat{a}_2)} \geq \ldots \geq \frac{v_n}{f(\hat{a}_n)}$$

where $v_i$ are the importance values and $f(\hat{\alpha}_i)$ is the sizing function. A minimum index value (x) of ranked nodes may next be determined that overflows the capacity of the electromagnetic state space (block 132). That is, the index x is determined where the combination of the first x nodes in the ranking order exceeds the capacity C, while the combination of the first x−1 nodes in the ranking order does not.

Turning now to FIG. 7, an attempt is now made to insert the ranked nodes i=1, . . . , x−1 into the electromagnetic state space (block 134). As described previously, the insertion process may involve modifying one or more operating parameters of certain controllable nodes to allow them to fit within the state space. Non-controllable nodes may be inserted without modification. It may next be determined whether any overlap exists amongst the inserted nodes (block 136). As will be described in greater detail, if overlap exists, overlapping nodes will need to be removed. In at least one embodiment, overlap may be determined using a bin approach. That is, the electromagnetic state space may be divided into a multitude of bins, with each dimension of the space being parsed into segments. Each node will then maintain a data structure corresponding to the bins of the state space. For each data structure, the bins of the state space will have a binary value of, for example, one if the bin is occupied by the corresponding node and zero if the bin is not occupied by the node. Overlap may then be identified by adding up the data structures. That is, if any bin of the result of the summation is greater than 1, there is overlap. Other techniques for identifying overlap may alternatively be used.

If overlap is identified (block 136-Y), then one or more overlapping nodes may be removed from the state space (block 138). The overlapping node(s) having the lowest rank will be removed. After one or more overlapping nodes have been removed, a next ranked node, if any, may be added to the state space (block 140). During a first iteration, this may include node x. Overlap is again tested in block 136, and the process of removing and adding nodes may be repeated. If no overlap is found in block 136 (block 136-N), then it may next be determined whether either the capacity C of the state space has been reached or there are no more ranked nodes that can be added to the state space (block 142). If the answer to both of these questions is no (block 142-N), then a next ranked node may be added to the state space and the above described process is repeated. If the answer to either of these questions is yes (block 142-Y), then it may next be determined if the capacity has been exceeded. If so, the last node added to the state space may be removed (block 144).

Turning now to FIG. 8, it may next be determined whether all of the nodes were successfully inserted into the state space without overlap (block 146). If so, it may then be determined whether it is desired to squeeze the nodes into a smaller volume (block 148). As described previously (in connection with method 100 of FIG. 5), if this is not desired (block 148-N), the method 120 may terminate (block 150). If it is desired (block 148-Y), then the radar standoff may be reduced (block 152) and the method 120 may return to block 128 of FIG. 6. The node insertion process will then be repeated with the new standoff value.

If all of the nodes were not successfully inserted into the state space (block 146-N), then a reduced electromagnetic volume may be determined for the radar that will still allow the radar to achieve at least a minimum effectiveness level (block 154). As described previously, in some embodiments, well-known space time adaptive processing (STAP) techniques may be used by the radar node to reduce the electromagnetic volume. Other techniques may also, or alternatively be used. A reduced electromagnetic volume may also be determined for one or more other nodes in the state space that will allow the nodes to still achieve at least a minimum effectiveness level (block 156). The method 120 may then return to block 128 of FIG. 6 and the node insertion process will be repeated with the reduced electromagnetic node volumes. In some embodiments, the node volumes of the radar and the other nodes (e.g., controllable nodes) may be reduced to a level that achieves the minimum effectiveness level on the first iteration of method 120. In other embodiments, the node volumes may be reduced in steps during successive iterations of method 120. As described previously, if reducing node volumes does not allow all nodes to fit within the electromagnetic state space, one or more nodes can be deactivated or moved from the space.

In the methods described above, techniques and features are described in the context of a radar node attempting to operate within an occupied state space. It should be reiterated, however, that these methods may also be implemented in connection with other node types (e.g., other military nodes or commercial nodes).

In some embodiments, features or techniques described herein may be implemented as instructions and/or functional data structures stored on non-transitory machine readable media. Examples of non-transitory machine readable media include magnetic disks, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, flash memories, USB drives, and/or other types of media suitable for storing electronic instructions or data.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A machine-implemented method for operating a radar system within a multi-dimensional electromagnetic state space, comprising:
    at least one processor to allow the radar system to operate within a multi-dimensional electromagnetic state space with a plurality of nodes without overlap between nodes, the at least one processor configured for:
        identifying a plurality of nodes to operate within the electromagnetic state space, the plurality of nodes including a radar node and at least one other node;
        estimating an electromagnetic volume of each node within the plurality of nodes;
        attempting to fit the estimated electromagnetic volumes of the plurality of nodes within the electromagnetic state space without overlap, wherein attempting to fit includes modifying transmit parameters associated with one or more nodes; and
        if the electromagnetic volumes of the plurality of nodes do not fit within the electromagnetic state space without overlap:
            determining a reduced electromagnetic volume for the radar node that will allow the radar node to achieve at least a minimum effectiveness level; and
            repeating attempting to it the estimated electromagnetic volumes of the plurality of nodes within the electromagnetic state space without overlap.

2. The method of claim 1, further comprising:
before repeating attempting to fit the estimated electromagnetic volumes within the electromagnetic state space, determining a reduced electromagnetic volume for each directly controllable node within the plurality of nodes, other than the radar node, that will allow the controllable node to achieve at least a minimum effectiveness level.

3. The method of claim 2, further comprising:
if the electromagnetic volumes of the plurality of nodes do not fit within the electromagnetic space without overlap after multiple iterations of determining reduced electromagnetic node volumes for the radar node and the directly controllable nodes, removing one or more of the plurality of nodes from the electromagnetic state space.

4. The method of claim 1, wherein:
the electromagnetic state space is defined based upon the operational needs of the radar node.

5. The method of claim 1, wherein:
identifying a plurality of nodes includes identifying nodes currently transmitting within the electromagnetic state space.

6. The method of claim 1, wherein:
identifying a plurality of nodes includes analyzing signals received from the electromagnetic state space.

7. The method of claim 1, wherein:
identifying a plurality of nodes includes checking one or more databases where users register for use of electromagnetic resources.

8. The method of claim 1, wherein:
determining a reduced electromagnetic volume for the radar system includes using space-time adaptive processing (STAP) techniques.

9. The method of claim 1, wherein:
the electromagnetic state space includes coordinates from at least 4 dimensions selected from the following: the three spatial dimensions (x, y, z), time, frequency, polarization direction, and orthogonal code.

10. The method of claim 1, wherein:
the electromagnetic state space includes coordinates from the following six dimensions: the three spatial dimensions (x, y, z), time, frequency, and polarization direction.

11. The method of claim 1, wherein:
the electromagnetic state space includes coordinates from the following seven dimensions: the three spatial dimensions (x, y, z), time, frequency, polarization direction, and orthogonal code.

12. The method of claim 1, further comprising:
if all of the nodes within the plurality of nodes fit within the electromagnetic state space without overlap:
    determining whether to squeeze the nodes tighter together within the electromagnetic state space; and
    reducing a standoff range of the radar node if a determination is made to squeeze the nodes tighter together.

13. A radar system comprising:
a radio frequency (RF) transmitter;
an RF receiver; and at least one processor to allow the radar system to operate within an electromagnetic state space with one or more other nodes without overlap between nodes, the at least one processor configured to:
- identify a plurality of nodes to operate within the electromagnetic state space, the plurality of nodes including the radar system and at least one other node;
- estimate an electromagnetic volume of each node within the plurality of nodes;
- attempt to fit the estimated electromagnetic volumes of the plurality of nodes within the electromagnetic state space without overlap, wherein the attempt to fit includes modification of transmit parameters associated with one or more nodes; and
- if the electromagnetic volumes of the plurality of nodes do not fit within the electromagnetic state space without overlap:
  - determine a reduced electromagnetic volume for the radar node that will allow the radar node to achieve at least a minimum effectiveness level; and
  - repeat the attempt to fit the estimated electromagnetic volumes of the plurality of nodes within the electromagnetic state space without overlap.

14. The radar system of claim 13, wherein the at least one processor is further configured to:
before repeating the attempt to fit the estimated electromagnetic volumes within the electromagnetic state space, determine a reduced electromagnetic volume for each directly controllable node within the plurality of nodes, other than the radar node, that will allow the controllable node to achieve at least a minimum effectiveness level.

15. The radar system of claim 14, wherein the at least one processor is further configured to:
if the electromagnetic volumes of the plurality of nodes do not fit within the electromagnetic state space without overlap after multiple iterations of determining reduced electromagnetic node volumes, removing one or more of the plurality of nodes from the electromagnetic state space.

16. A machine-implemented method for operating a radar system within a multi-dimensional electromagnetic state space, comprising:
at least one processor to allow the radar system to operate within a multi-dimensional electromagnetic state space with a plurality of nodes without overlap between nodes, the at least one processor configured for;
- identifying a plurality of nodes to operate within the electromagnetic state space, the plurality of nodes including a radar node and at least one other node;
- determining a capacity of the electromagnetic state space;
- assigning an importance value to each node in the plurality of nodes;
- estimating an electromagnetic volume of each node within the plurality of nodes;
- ranking the plurality of nodes based on value density;
- identifying a minimum number of highest ranking nodes within the plurality of nodes that will exceed the capacity of the electromagnetic state space;
- attempting to fit electromagnetic volumes associated with less than the minimum number of highest ranking nodes into the electromagnetic state space without overlap, wherein attempting to fit includes modifying transmit parameters associated with one or more nodes; and
- if the electromagnetic volumes associated with the less than minimum number of highest ranking nodes do not fit within the electromagnetic state space without overlap:
  - removing at least one overlapping node from the electromagnetic state space and adding at least one other node to the electromagnetic state space to form a modified group of nodes; and
  - attempting to fit electromagnetic volumes associated with the modified group of nodes into the electromagnetic state space without overlap.

17. The method of claim 16, further comprising:
repeating removing at least one overlapping node and adding at least one other node and attempting to fit electromagnetic volumes associated with the modified group of nodes into the electromagnetic state space without overlap until a maximum number of nodes have been inserted into the state space without overlap.

18. The method of claim 16, wherein:
removing at least one overlapping node from the electromagnetic state space includes removing a lowest ranking overlapping node.

19. The method of claim 16, further comprising:
if the electromagnetic volumes of all nodes within the plurality of nodes cannot be fit into the electromagnetic state space without overlap:
- determining a reduced electromagnetic volume for the radar node that will allow the radar node to achieve at least a minimum effectiveness level; and
- repeating ranking the plurality of nodes based on value density; identifying a minimum number of highest ranking nodes within the plurality of nodes that will exceed the capacity of the electromagnetic state space; and attempting to fit electromagnetic volumes associated with less than the minimum number of highest ranking nodes into the electromagnetic state space without overlap.

20. The method of claim 19, further comprising:
before repeating ranking the plurality of nodes, determining a reduced electromagnetic volume for each directly controllable node within the plurality of nodes, other than the radar nod; that will allow the controllable node to achieve at least a minimum effectiveness level.

* * * * *